(12) United States Patent
Um

(10) Patent No.: US 9,998,680 B2
(45) Date of Patent: Jun. 12, 2018

(54) OPTICAL MEMBER AND CAMERA MODULE INCLUDING THE SAME HAVING A SILVER HALIDE LAYER OF VARYING DISPERSION

(71) Applicant: LG INNOTEK CO., LTD., Seoul (KR)

(72) Inventor: Kee Tae Um, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

(21) Appl. No.: 15/115,178

(22) PCT Filed: Jan. 29, 2015

(86) PCT No.: PCT/KR2015/000973
§ 371 (c)(1),
(2) Date: Jul. 28, 2016

(87) PCT Pub. No.: WO2015/115832
PCT Pub. Date: Aug. 6, 2015

(65) Prior Publication Data
US 2016/0344914 A1 Nov. 24, 2016

(30) Foreign Application Priority Data
Jan. 29, 2014 (KR) ........................ 10-2014-0011598

(51) Int. Cl.
*H04N 5/238* (2006.01)
*G03B 9/02* (2006.01)
(Continued)

(52) U.S. Cl.
CPC ............. *H04N 5/238* (2013.01); *G02B 5/003* (2013.01); *G02B 5/005* (2013.01);
(Continued)

(58) Field of Classification Search
CPC ...... H04N 5/238; H04N 5/2254; G02B 5/005; G02B 13/0055; G02B 5/003; G03B 11/00; G03B 9/02
See application file for complete search history.

(56) References Cited

U.S. PATENT DOCUMENTS 6,623,896 B1 * 9/2003 Szajewski ............... G03C 7/14
430/21
2003/0142412 A1 7/2003 Shirasuna
(Continued)

FOREIGN PATENT DOCUMENTS

JP 2002-341505 A 11/2002
JP 2005-062210 A 3/2005
(Continued)

*Primary Examiner* — Gevell Selby
(74) *Attorney, Agent, or Firm* — Birch, Stewart, Kolasch & Birch, LLP

(57) ABSTRACT

An optical member and a camera module comprising the same are disclosed. The optical member comprises a base material layer and a halide layer which is arranged on the base material layer, and in which the distribution amount of silver halide in the direction toward the edge of the base material layer is equal to or greater than the distribution amount of silver halide in the direction toward the center of the base material layer.

19 Claims, 3 Drawing Sheets

(51) Int. Cl.
  *G03B 11/00*  (2006.01)
  *G02B 5/00*   (2006.01)
  *H04N 5/225*  (2006.01)
  *G02B 13/00*  (2006.01)

(52) U.S. Cl.
  CPC ........... *G02B 13/0055* (2013.01); *G03B 9/02* (2013.01); *G03B 11/00* (2013.01); *H04N 5/2254* (2013.01); *H04N 5/2257* (2013.01)

(56) References Cited

U.S. PATENT DOCUMENTS

| | | | |
|---|---|---|---|
| 2003/0232260 A1* | 12/2003 | Irving | G03C 1/7614 430/21 |
| 2004/0018454 A1 | 1/2004 | Tatsuta et al. | |
| 2006/0134533 A1* | 6/2006 | Seo | G02B 1/11 430/5 |
| 2012/0105400 A1* | 5/2012 | Mathew | H04N 5/2251 345/207 |

FOREIGN PATENT DOCUMENTS

| KR | 10-2006-0063127 A | 6/2006 |
|---|---|---|
| KR | 10-2008-0048113 A | 6/2008 |

* cited by examiner (a)

(b)

OPTICAL MEMBER AND CAMERA MODULE INCLUDING THE SAME HAVING A SILVER HALIDE LAYER OF VARYING DISPERSION

CROSS REFERENCE TO RELATED APPLICATIONS

This application is the National Phase of PCT International Application No. PCT/KR2015/000973, filed on Jan. 29, 2015, which claims priority under 35 U.S.C. 119(a) to Patent Application No. 10-2014-0011598, filed in the Republic of Korea on Jan. 29, 2014, all of which are hereby expressly incorporated by reference into the present application.

TECHNICAL FIELD

The present invention relates to an optical member and a camera module including the same, and more particularly, to an optical member, which is applied to a miniature camera, a mobile device, and the like, and a camera module including the same.

BACKGROUND ART

Recently, as demand for mobile devices on which a camera is mounted has increased, research on a mobile camera has been actively progressing.

Due to a characteristic of a mobile camera which is mounted on a mobile device, the size of the mobile camera is constrained.

In the case of a mechanical stop, the stop and a lens need to be spaced a predetermined interval or more from each other because of a thickness of the stop itself. Therefore, the mechanical stop could not be applied to the mobile camera.

Accordingly, when a photograph is captured by a mobile camera at a bright place, such as a beach in the summer, outside of a range in which the mobile camera can be controlled by an electronic shutter and the like, there is a problem in that a good photograph cannot be captured due to the saturation of brightness.

Technical Problem

The present invention is directed to providing an optical member which acts as a stop, and a camera module for a mobile device including the same.

Technical Solution

One aspect of the present invention provides an optical member. The optical member includes a base material layer and a halide layer which is disposed on the base material layer. In the halide layer, a distribution amount of a silver halide (AgX) is gradually increased from the center of the base material layer toward an edge thereof.

The silver halide (AgX) may be at least one of silver bromide (AgBr), silver chloride (AgCl), and silver iodide (AgI), or a selective combination thereof.

Another aspect of the present invention provides a camera module. The camera module includes an image sensor, a lens module disposed on the image sensor, and an optical member disposed on the lens module and configured to adjust an amount of light incident on the lens module. The optical member includes a base material layer and a halide layer disposed on the base material layer. In the halide layer, a distribution amount of a silver halide (AgX) is gradually increased from the center of the base material layer toward an edge thereof.

The optical member may be a cover window.

The silver halide (AgX) may be at least one of silver bromide (AgBr), silver chloride (AgCl), and silver iodide (AgI), or a selective combination thereof.

Still another aspect of the present invention provides a camera module. The camera module includes an image sensor, a lens module disposed on the image sensor and including a plurality of lenses sequentially disposed along an optic axis, and an optical member disposed between the plurality of lenses and configured to adjust an amount of light incident on the lens module. The optical member includes a base material layer and a halide layer disposed on the base material layer. In the halide layer, a distribution amount of a silver halide (AgX) is gradually increased from the center of the base material layer toward an edge thereof.

The optical member may be an aperture stop.

The optical member may be disposed between a first lens of the plurality of lenses, which is disposed closest to an object side, and a second lens disposed on an image side of the first lens.

The optical member may be disposed so that light passing through the center of an entrance pupil of the lens passes through the center of the optical member and light passing through an end of an edge of the entrance pupil of the lens passes through an end of an edge of the optical member.

The silver halide (AgX) may be at least one of silver bromide (AgBr), silver chloride (AgCl), and silver iodide (AgI), or a selective combination thereof.

MODES OF THE INVENTION

Figure 1:
FIG. 1 is a view illustrating an optical member according to one embodiment of the present invention.
Figure 1:
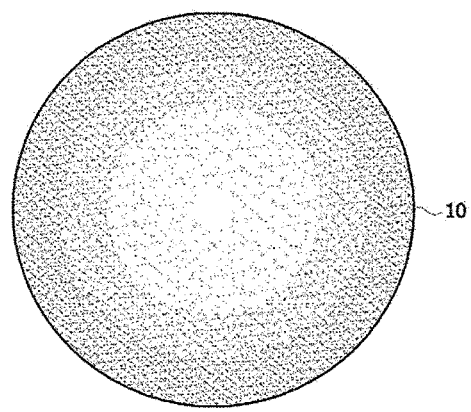

While the present invention may be modified in various ways and take on various alternative forms, specific embodiments thereof are shown in the drawings and described in detail below as examples. There is no intent to limit the present invention to the particular forms disclosed. On the contrary, the present invention is to cover all modifications, equivalents, and alternatives falling within the spirit and scope of the appended claims.

Although the terms "first," "second," etc. may be used herein to describe various elements, these elements should not be limited by these terms. These terms are only used to distinguish one element from another. For example, a first element could be referred to as a second element, and, similarly, a second element could be referred to as a first element, without departing from the scope of the present invention. As used herein, the term "and/or" includes any and all combinations of one or more of the associated listed items.

In addition, a suffix "module," "unit," or "portion" of an element used herein is assigned or incorporated for convenience of specification description, and the suffix itself does not have a distinguished meaning or function.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," and "an" are intended to include the plural forms as well, unless the context clearly indicates otherwise. It will be further understood that the terms "comprise," "comprising," "include" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings, the same or corresponding component is identified by the same reference number regardless of numerals in the drawings, and redundant description thereof will be omitted.

Figure 2:
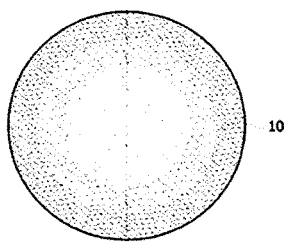
FIG. 2 is a view for describing an optical characteristic of a halide layer according to one embodiment of the present invention.
Figure 2:
Figure 2:
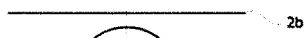
Figure 2:

FIG. 1 is a view illustrating an optical member according to one embodiment of the present invention, and FIG. 2 is a view for describing an optical characteristic of a halide layer according to one embodiment of the present invention.

FIG. 1A is a view illustrating a side surface of the optical member and FIG. 1B is a view illustrating an upper surface of the optical member.

Referring to FIG. 1, an optical member 10 may include a base material layer 11 and a halide (halogenide) layer 12 and may be formed in a disk shape.

The base material layer 11 may be formed of a transparent material such as glass and a transparent resin.

The present invention is not limited thereto, and as a transparent resin forming the base material layer 11, at least one of polycarbonate (PC), polymethylmethacrylate (PMMA), polystyrene (PS), polyethyleneterephthalate (PET), polyethylenenaphthalate (PEN), polyethersulfone (PES), an allyl resin, methylmethacrylate (MMA), or a selective combination thereof.

The halide layer 12 which is a photosensitive emulsion may be disposed on the base material layer 11.

The present invention is not limited thereto, and the halide layer 12 may be formed of a silver halide (AgX). At least one of silver bromide (AgBr), silver chloride (AgCl), and silver iodide (AgI), or a selective combination thereof may be used as the silver halide (AgX) which is a halogen compound of silver (Ag).

The silver halide may control a transmittance of light according to intensity of ultraviolet light which is incident on the silver halide. When the silver halide is exposed in a bright environment in which the intensity of ultraviolet light is high, the light is blocked by absorbing the light while silver ions are converted into silver atoms, and when the silver halide is exposed in a dark environment in which the intensity of ultraviolet light is low, the silver atoms return to an ion crystal of the silver halide and a light-blocking effect disappears.

As illustrated in FIG. 2A, the halide layer 12 may be formed so that a distribution of a silver halide is gradually increased from the center of the halide layer 12 toward an edge thereof. The present invention is not limited thereto, and the distribution of the silver halide in the halide layer 12 may be represented as a Gaussian distribution of which the center is a vertex.

FIG. 2A is a view illustrating a distribution amount 2a of the silver halide of the halide layer 12 according to a position thereof, and it may be seen that the distribution amount of the silver halide at the center of the halide layer 12 is shown as a minimum and the distribution amount of the silver halide toward the edge thereof is gradually increased.

FIG. 2B, which is a view illustrating a transmittance 2b of the halide layer 12 in a dark environment and a transmittance 2c of the halide layer 12 in a bright environment, is a view illustrating the transmittance in a case in which a distribution amount of a silver halide is increased from the center of the halide layer 12 toward the edge thereof.

Referring to FIG. 2B, in a bright environment in which intensity of ultraviolet light is high, the transmittance of the halide layer 12 at the center thereof is maximal, and the transmittance of the halide layer 12 is gradually reduced toward the edge thereof. Further, in a dark environment, light-blocking of the halide layer 12 does not occur, and thus the transmittance of the halide layer 12 is not affected by the distribution amount of the silver halide.

The optical member 10 having the above-described configuration performs a stop function through the halide layer 12 of which the transmittance is automatically adjusted according to an amount of light. Further, since the optical member 10 is provided in a thin film form, the optical member 10 requires only a relatively small installation space compared to a mechanical stop. Therefore, the optical member 10 having the above-described configuration may be used as a stop by being mounted on a mobile camera.

Generally, a stop may be provided by forming a through-hole at the center of a black sheet. In this case, the diffraction of light is caused by a shape of an edge of the stop forming the through-hole, and thus there is a problem in that the resolution of the lens is reduced.

In the embodiment of the present invention, as the halide layer 12 is formed so that the distribution amount of the silver halide is increased from the center of the optical member 10 toward an edge thereof, there is an effect that the resolution of the lens is prevented from being reduced by preventing the above-described diffraction of light from occurring.

When the base material layer 11 needs to be coated with a small thickness of the silver halide (AgX), it is not easy to form the small thickness through direct coating. Accordingly, the halide layer 12 may be formed using a method of coating by mixing a gelatin emulsion with the silver halide (AgX).

The optical member 10 having the above-described configuration may act as a stop by being applied to a camera module. The present invention is not limited thereto, and the optical member 10 may be used as an aperture stop to limit an amount of light, which is used in an optical system including a lens module of a camera.

When the optical member 10 having the above-described configuration is applied to the camera module as a stop, the optical member 10 may be disposed at various positions.

For example, the optical member 10 may be disposed at the object side based on the lens module constituting the camera module. Further, for example, the optical member 10 may be disposed inside the lens module of the camera module, that is, between the lenses. Further, for example, the optical member 10 may be disposed between the lens module of the camera module and an optical filter or between the lens module and an image sensor.

Figure 3:
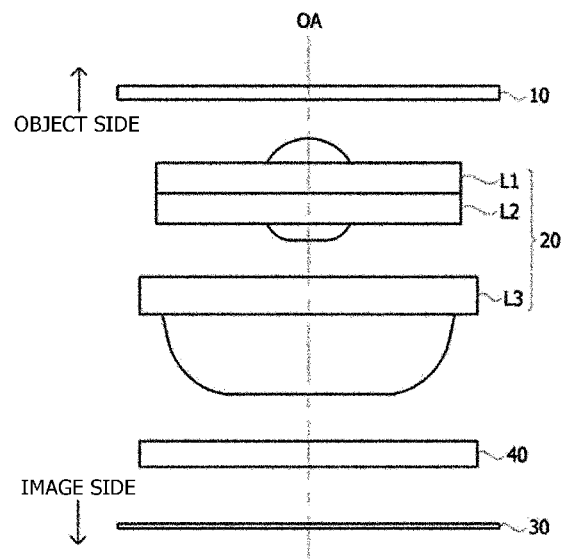
FIGS. 3 and 4 are views illustrating examples of a camera module to which the optical member according to one embodiment of the present invention is applied.

FIG. 3 is a view illustrating an example in which an optical member according to one embodiment of the present invention is applied to a camera module. Further, FIG. 4 is a view illustrating another example in which the optical member according to one embodiment of the present invention is applied to the camera module.

Figure 4:
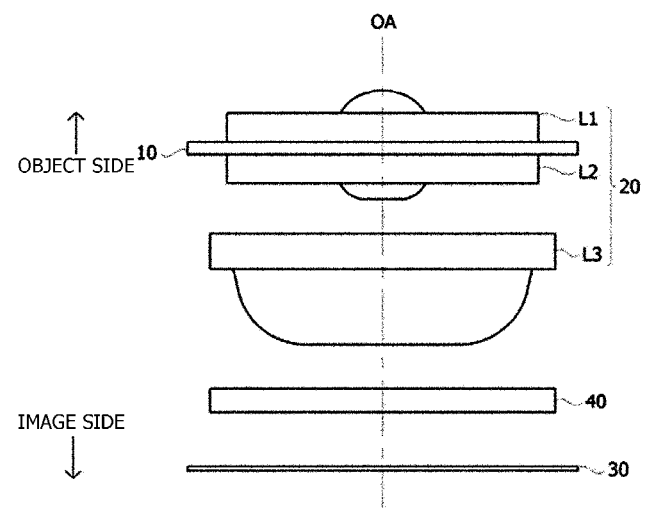

Referring to FIGS. 3 and 4, the camera module may include an optical member 10, a lens module 20, and an image sensor 30. Further, the camera module may further include an optical filter 40 disposed between the image sensor 30 and the lens module 20.

The image sensor 30 performs a function of receiving light corresponding to image information on an object through the lens module 20 and converting the light into an electrical signal.

The present invention is not limited to the image sensor 30, and the image sensor 30 may include a metal-oxide semiconductor (MOS), a charge coupled device (CCD) and the like.

The lens module 20 may be disposed on the image sensor 30. That is, the lens module 20 may be disposed at an object side based on the image sensor 30.

The lens module 20 may include at least one of lenses L1, L2, and L3 which are sequentially disposed along an optic axis OA from the object side toward an image side. In the lens module 20, a straight line which connects the centers of curvatures of both surfaces of a single lens corresponds to an optic axis of the single lens, and a straight line which connects the optic axes of the lenses corresponds to an optic axis of the lens module 20.

Meanwhile, the lens modules 20 illustrated in FIGS. 3 and 4 are for describing one embodiment of the present invention, and the embodiment of the present invention is not limited thereto. Shapes, arrangement, the number, and the like of the lenses constituting the lens module 20 may be variously modified.

The optical filter 40 may be disposed between the image sensor 30 and the lens module 20.

The optical filter 40 may include at least any one optical filter such as an infrared (IR) filter, a cover glass, and the like.

When the optical filter 40 includes an IR filter, radiant heat emitted from external light is blocked by the optical filter 40 so as not to be transferred to the image sensor 30. Further, visible light may pass through the optical filter 40, and IR rays may be reflected by the optical filter 40 to be discharged to the outside.

The optical member 10 may act as a stop which adjusts the transmittance of light incident from the outside, and may include the base material layer 11 (see FIG. 1) and the halide layer 12 (see FIG. 1) disposed on the base material layer 11.

The halide layer 12 may be formed on an object side surface of the optical member 10. Here, the object side surface refers to a surface facing the object side based on the optic axis OA.

Meanwhile, in the present embodiment, the halide layer 12 is formed on the object side surface of the optical member 10, but the present invention is not limited thereto, and the halide layer 12 may be formed on an image side surface of the optical member 10. Here, the image side surface refers to a surface facing the image side based on the optic axis OA.

The halide layer 12 may be provided so that a distribution amount of a silver halide is gradually increased toward the edge of the halide layer 12.

As illustrated in FIG. 3, the optical member 10 may be disposed on the lens module 20.

Referring to FIG. 3, the optical member 10 may be disposed on the lens module 20. That is, the optical member 10 may be disposed at the object side based on the lens module 20.

The optical member 10 may also perform a cover window function.

As illustrated in FIG. 3, when the optical member 10 serving as a stop is disposed close to the object side relative to the lens module 20, a full-length of the lens module 20 may be reduced and thus the camera module may be miniaturized.

As illustrated in FIG. 4, the optical member 10 may be disposed inside the lens module 20.

Referring to FIG. 4, when lenses constituting the lens module 20 are sequentially referred to as a first lens L1, a second lens L2, and a third lens L3 from the object side toward the image side, the optical member 10 may be disposed next to the first lens L1 which is disposed closest to the object side.

FIG. 4 is a view illustrating an example in which the optical member 10 is disposed inside the lens module 20, and a position of the optical member 10 may vary according to the number, shapes, arrangement, and the like of the lenses L1, L2, and L3 constituting the lens module 20.

Meanwhile, when the optical member 10 is disposed inside the lens module 20, the optical member 10 may be disposed at a position of an aperture stop in order to adjust an amount of light and depth of focus thereof without damaging image formation. That is, the optical member 10 may be disposed so that light passing through the center of an entrance pupil of the lens passes through the center of the optical member 10 and light passing through an end of an edge of the entrance pupil of the lens passes through an end of an edge of the optical member 10.

When the optical member 10 is disposed outside the position of the aperture stop, a problem in that brightness in a peripheral portion of the imaged image is significantly degraded and relative illumination is reduced, or the image in the peripheral portion is cut and the image is not imaged at the image sensor 30 may occur.

According to the above description, the stop is disposed at the image side of the lens module, the shape of the lens is controlled so that a portion of the lens module at the image side is accommodated in an inner space of a stop housing, and thus there is an effect that it is possible to apply a mechanical stop thereto and a thickness of the camera module is minimized. Further, a required effective diameter is reduced, and thus it is possible to minimize the size of the lens module.

Further, a stopper is disposed between the stop housing and a lens housing, and thus the stop and the image side of the lens may be prevented from colliding with each other.

Therefore, as the camera module to which the stop is applied may be mounted on a mobile device, the camera module may support the user so that the user may capture the desired quality of a photograph by adjusting an amount of light according to a camera use environment.

Figure 5:
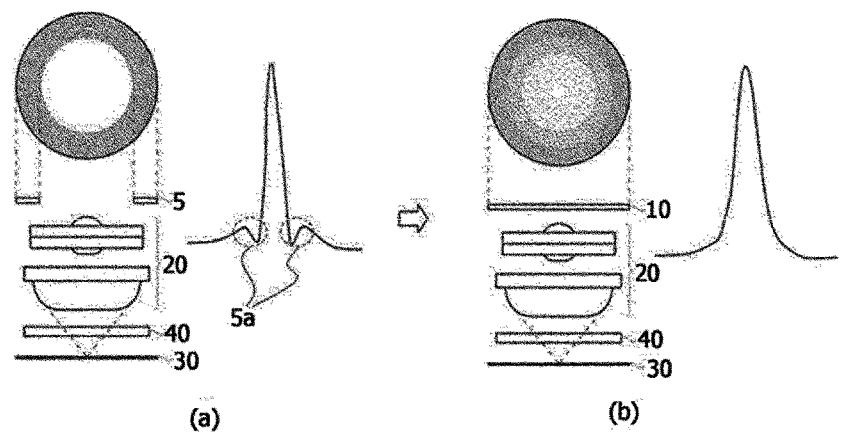
FIG. 5 is a view for describing effects in a case in which the optical member according to one embodiment of the present invention is applied to a camera module.

FIG. 5 is a view for describing effects in a case in which the optical member according to one embodiment of the present invention is applied to a camera module.

FIG. 5A is a view illustrating a case in which a general stop 5 provided by forming a through-hole at the center of a black sheet is applied, and FIG. 5B is a view illustrating a case in which an optical member 10 according to the embodiment of the present invention is applied as a stop.

Referring to FIG. 5A, light is diffracted by a shape of an edge of the stop 5, and thus it may be seen that airy disks 5a are generated in the vicinity of the edge thereof.

On the other hand, in FIG. 5B, as a halide layer 12 is formed by gradually changing a distribution of a silver halide, airy disks may be prevented from being generated by preventing light from being diffracted.

While the example embodiments of the present invention and their advantages have been described above in detail, it should be understood that various changes, substitutions and alterations may be made herein without departing from the scope of the invention as defined by the following claims.

The invention claimed is:

1. An optical member comprising:
    a base material layer; and
    a halide layer disposed on the base material layer and including silver halide (AgX) dispersed throughout the halide layer,
    wherein a dispersion amount of the silver halide (AgX) continuously increases in gradual amounts from a center of the base material layer towards an edge thereof.

2. The optical member of claim 1, wherein the distribution amount of the silver halide is saturated in an area outside of a predetermined radius from the center of the base material layer.

3. The optical member of claim 1, wherein the silver halide (AgX) is at least one of silver bromide (AgBr), silver chloride (AgCl), and silver iodide (AgI), or a selective combination thereof.

4. The optical member of claim 1, wherein the silver halide is Gaussian distributed with respect to a center of the halide layer.

5. The optical member of claim 1, wherein a light transmittance of the halide layer increases as the dispersion amount of the silver halide decreases.

6. A camera module comprising:
    an image sensor;
    a lens module disposed on the image sensor; and
    an optical member disposed on the lens module and configured to adjust an amount of light incident on the lens module,
    wherein the optical member includes:
    a base material layer; and
    a halide layer disposed on the base material layer and including silver halide (AgX) dispersed throughout the halide layer,
    wherein a dispersion amount of the silver halide (AgX) continuously increases in gradual amounts from a center of the base material layer towards an edge thereof.

7. The camera module of claim 6, wherein the distribution amount of the silver halide is saturated in an area outside of a predetermined radius from the center of the base material layer.

8. The camera module of claim 6, wherein the optical member is a cover window.

9. The camera module of claim 6, wherein the silver halide (AgX) is at least one of silver bromide (AgBr), silver chloride (AgCl), and silver iodide (AgI), or a selective combination thereof.

10. The camera module of claim 6, wherein the silver halide is Gaussian distributed with respect to a center of the halide layer.

11. The camera module of claim 6, wherein a light transmittance of the halide layer increases as the dispersion amount of the silver halide decreases.

12. A camera module comprising:
    an image sensor;
    a lens module disposed on the image sensor and including a plurality of lenses sequentially disposed along an optic axis; and
    an optical member disposed between the plurality of lenses and configured to adjust an amount of light incident on the lens module,
    wherein the optical member includes:
    a base material layer; and
    a halide layer disposed on the base material layer and including silver halide (AgX) dispersed throughout the halide layer,
    wherein a dispersion amount of the silver halide (AgX) continuously increases in gradual amounts from a center of the base material layer towards an edge thereof.

13. The camera module of claim 12, wherein the distribution amount of the silver halide is saturated in an area outside of a predetermined radius from the center of the base material layer.

14. The camera module of claim 12, wherein the optical member is an aperture stop.

15. The camera module of claim 12, wherein the optical member is disposed between a first lens of the plurality of lenses, which is disposed closest to an object side, and a second lens disposed on an image side of the first lens.

16. The camera module of claim 12, wherein the optical member is disposed so that light passing through a center of an entrance pupil of the lens passes through a center of the optical member and light passing through an end of an edge of the entrance pupil of the lens passes through an end of an edge of the optical member.

17. The camera module of claim 12, wherein the silver halide (AgX) is at least one of silver bromide (AgBr), silver chloride (AgCl), and silver iodide (AgI), or a selective combination thereof.

18. The camera module of claim 12, wherein the silver halide is Gaussian distributed with respect to a center of the halide layer.

19. The camera module of claim 12, wherein a light transmittance of the halide layer increases as the dispersion amount of the silver halide decreases.

* * * * *